United States Patent
Saar et al.

(10) Patent No.: US 12,533,416 B2
(45) Date of Patent: Jan. 27, 2026

(54) KRILL OIL FOR SOLUBILIZING POORLY WATER-SOLUBLE DIETARY SUPPLEMENTS AND PHARMACEUTICALLY ACTIVE AGENTS

(71) Applicant: ID CARE UG (haftungsbeschränkt), Niederkassel (DE)

(72) Inventors: Ingo Saar, Niederkassel (DE); Wolfgang Brysch, Berlin (DE)

(73) Assignee: ID CARE UG (haftungsbeschränkt), Niederkassel (DE)

( * ) Notice: Subject to any disclaimer, the term of this patent is extended or adjusted under 35 U.S.C. 154(b) by 1103 days.

(21) Appl. No.: 16/977,655

(22) PCT Filed: Mar. 6, 2019

(86) PCT No.: PCT/EP2019/000068
§ 371 (c)(1),
(2) Date: Sep. 2, 2020

(87) PCT Pub. No.: WO2019/170284
PCT Pub. Date: Sep. 12, 2019

(65) Prior Publication Data
US 2020/0397905 A1    Dec. 24, 2020

(30) Foreign Application Priority Data
Mar. 7, 2018  (EP) .................................... 18000226

(51) Int. Cl.
| | |
|---|---|
| A61K 47/44 | (2017.01) |
| A23L 33/105 | (2016.01) |
| A23L 33/115 | (2016.01) |
| A61K 9/00 | (2006.01) |
| A61K 9/08 | (2006.01) |
| A61K 31/355 | (2006.01) |
| A61K 31/365 | (2006.01) |
| A61K 31/522 | (2006.01) |
| A61K 31/7052 | (2006.01) |
| A61K 36/324 | (2006.01) |
| A61K 36/82 | (2006.01) |
| A61K 36/9068 | (2006.01) |

(52) U.S. Cl.
CPC ............ *A61K 47/44* (2013.01); *A23L 33/105* (2016.08); *A23L 33/115* (2016.08); *A61K 9/0095* (2013.01); *A61K 9/08* (2013.01); *A61K 31/355* (2013.01); *A61K 31/365* (2013.01); *A61K 31/522* (2013.01); *A61K 31/7052* (2013.01); *A61K 36/324* (2013.01); *A61K 36/82* (2013.01); *A61K 36/9068* (2013.01)

(58) Field of Classification Search
None
See application file for complete search history.

(56) References Cited

FOREIGN PATENT DOCUMENTS

| | | |
|---|---|---|
| AU | 2014200052 A1 | 1/2014 |
| CA | 2 839 075 * | 3/2009 |
| EP | 16001941 | 3/2018 |
| WO | WO 03/007907 A1 | 1/2003 |
| WO | WO 2007/103435 | 9/2007 |
| WO | WO 2012/172411 A1 | 12/2012 |
| WO | WO 2013/108254 | 7/2013 |
| WO | WO 2014/094921 A1 | 6/2014 |
| WO | WO 2016/156528 A1 | 10/2016 |
| WO | WO 2017/139846 A1 | 8/2017 |

OTHER PUBLICATIONS

Air Pressure, 5 pages, 2024.*
D. Han et al., "Solubilization of Vitamin C in Fish Oil and Synergistic Effect with Vitamin E in Retarding Oxidation", JAOCS, vol. 68, No. 10, Oct. 1991, pp. 740-743.
Canadian Office Action Corresponding to 3,091,976 mailed Feb. 9, 2024.
International Search Report and Written Opinion mailed on May 6, 2019 in corresponding International Application No. PCT/EP2019/000068.

* cited by examiner

Primary Examiner — Michael V Meller
(74) Attorney, Agent, or Firm — Finch & Maloney PLLC

(57) ABSTRACT

The present invention relates to a method for solubilizing poorly water-soluble dietary supplements and pharmaceutically active agents by means of hill oil extract, to the solubilisate produced by this method and respective uses as a dietary supplement or pharmaceutical dosage form.

6 Claims, No Drawings

KRILL OIL FOR SOLUBILIZING POORLY WATER-SOLUBLE DIETARY SUPPLEMENTS AND PHARMACEUTICALLY ACTIVE AGENTS

CROSS-REFERENCE TO RELATED APPLICATIONS

This application is the National Stage entry under 35 U.S.C. § 371 of International Application No. PCT/EP2019/000068 filed on Mar. 6, 2019, published on Sep. 12, 2019, under Publication Number WO 2019/170284 A1, which claims the benefit of priority under 35 U.S.C. § 119 of European Patent Application Number 18000226.3 filed on Mar. 7, 2018, the entireties of which are herein incorporated by reference.

The present invention relates to a method for solubilizing poorly water-soluble dietary supplements and pharmaceutically active agents by means of krill oil, to the solubilisate produced by this method and respective uses as a dietary supplement or pharmaceutical dosage form.

A broad variety of substances are known for which potentially beneficial effects on human health have been found in experimental settings. The use of many of them, however, has been seriously limited by the poor bioavailability that can be achieved by application forms known in the state-of-the-art. In pharmacology, bioavailability is a parameter that indicates the fraction of an administered dose of unchanged drug that finally becomes available in the systemic circulation for the desired pharmacological effects. Poor bioavailability is often due to a poor water solubility, respectively the lipophilic nature of the active agent to be administered. Hence, the use of such substances as a dietary supplement or as a pharmaceutically active agent is impaired when using standard dosage forms.

There is a variety of approaches for improving the solubility of such agents and in many cases also their bioavailability by using solubilization techniques. Herein the solubility of an agent in a medium is augmented by adding a third substance. These third substances are referred to as solubilizers (solubilizing agents), substances that may for example build a complex with the substance to be solubilized. Examples for such chelating agents are sodium benzoate and sodium salicylate. Another mechanism of action of solubilizers is the augmentation of the dissolving capacity of the solvent, for example by disturbing the cluster structure of water. Examples for such structure breakers are glycerol (glycerin) and macrogols (polyethylene glycol, PEG).

A third solubilization mechanism are micelle and liposome application technologies. They have won broad attention throughout the last decades. Herein the substance to be delivered is enclosed in a spherical aggregate of surfactant molecules. These molecules are characterized by a polar head group and a long nonpolar chain ("tail"). When given into an aqueous medium these molecules tend to associate by aggregating to spherical structures by orienting the polar head group towards the surrounding medium and the nonpolar chain towards the interior of the spheres. When these spheres consist of only one layer of such amphiphilic molecules they are referred to as micelles. Depending on the nature of the amphiphilic molecule and the reaction conditions it is also possible to form spheres with more than one layer. Herein a second layer is formed inside the outer layer of the sphere, the nonpolar groups of this second layer being oriented towards the nonpolar groups of the outer layer, and the polar head groups being oriented towards the interior of the sphere. Such aggregates are referred to as liposomes. In their structure they resemble the lipid bilayer of the cell membrane. There are also multi-layered liposomes in which at least two liposomal spheres are formed concentrically around one another, thus building a multispherical aggregate. When given in a lipophilic medium these substances tend to build inversed spherical structures where the lipophilic chain is oriented towards the solution medium and the other layers are arranged accordingly.

Different uses of such loaded spheres have been described in the art, among them the usage as a dosage form for the application of lipophilic substances and/or for increasing the bioavailability of the enclosed substance. In micelles, the enclosed nonpolar substance concentrates in the interior space of the sphere toward which the nonpolar chains of the amphiphilic molecules are oriented. In liposomes, however, the interior space of the spheres is an aqueous, respectively hydrophilic medium. It can serve for packaging hydrophilic molecules. Poorly water-soluble, respectively lipophilic molecules, however, gather mostly in between the lipophilic structures of the liposomal layers.

A micelle-based solubilisate for solubilizing dietary supplements is known for ubiquinone $Q_{10}$ (WO 03/007907 A1) or curcumin (WO2014/094921 A1). Therein an emulsifier with a HLB (hydrophilic-lipophilic balance) value of 9-16 or 13-18 is used, respectively. Polysorbate (Tween) 20 or 80 is preferred. Until now, the implementation of this technology is apparently limited to the production of chewing gum. However, there is an ongoing controversy about a detrimental impact of polysorbates on health. Polysorbate-20 is discussed to be contaminated with unreacted 1,4-dioxane and ethylene oxide (at least from some suppliers). These are known skin-permeable carcinogenic substances (cf. http://www.fda.gov/ohrms/dockets/98fr/060199a.txt, as of Jun. 7, 2017). Polysorbate-80 was recently found to have detrimental effects on murine gut microbiota, thus promoting obesity and inflammatory bowel diseases (Chassaing et al., Nature, 2015, 519, 92-96). A further problem of the use of polysorbate (Tween)-based solutions is their soapy taste. This renders them unattractive for dietary supplements and liquid oral medications.

WO 2007/103435 A1 discloses that an increased bioavailability of curcuminoids (curcumin ester derivatives) can be achieved by admixing micelles, microemulsions or microencapsulated oils as well as an antioxidant and advisably a glucuronidation inhibitor to the curcuminoids. The use of a surfactant such as poloxamers or polysorbate 20, polysorbate 60, polysorbate 80 is particularly preferred. This composition shall be apt to treat Alzheimer's disease. Glucuronidation inhibitors, however, inhibit also the proper metabolization and consequently the elimination of other drugs or endogenous substances. Thus their use is a double-edged sword and should depend on the medication of each individual patient. Therefore such a composition might bear problems for an everyday use of a dietary supplement or a long-term medication.

From empiric pharmacokinetic measurements it is known that the organism can absorb micelles as well as liposomes in the gastrointestinal tract via the intestinal villi. However, their degree of absorption seems to be rather variable and therefore these methods have met a mixed success for augmenting the bioavailability of the enclosed compound. The transport, respectively the absorption rate over the cell membrane is an intrinsic characteristic for each substance, depending on a variety of factors such as molecule size, degree of lipophilicity and the presence of suitable transporter molecules inside the cell membrane. For many compounds these parameters are not known and would have to be determined first before finding a suitable packaging for this specific compound.

Liposomal applications have been widely discussed in medicine and pharmacology and some sophisticated solutions have been developed for specific active agents. Their use, however, is not very common. One reason are the relatively high production costs, another reason are possible adverse side effects. In particular, when parenterally applied, liposomes carry the risk of accumulating in the liver, the spleen and/or the bone marrow. Therefore, liposomal formulations are often viewed skeptically.

A nano-liposphere-based formulation method for increasing drug bioavailability was disclosed in WO 2013/108254. Although this method offers some advancement over the state-of-the-art there are also some inherent drawbacks. High-pressure homogenizers are needed for the production of these solid lipid nanoparticles. However, high-pressure induced drug degradation has been described for some drugs or dietary supplements. Lipid crystallization, gelation phenomena and co-existence of several colloidal species occur. Further restrictive factors such as cytotoxic effects after phagocytosis, toxic effects of organic residues and a difficult industrial scale-up have limited their use until now (Mehnert and Mäder, Adv Drug Deliv Res 2001, 47, 165-196; Dudala et al., Int J Pharm Investg 2014, 4, 149-155). Moreover, their drug loading capacity is relatively small and they display a low viscosity. This makes them not very attractive for topic or transdermal application forms (Mukherjee et al., Indian J Pharm Sci 2009, 71, 349-358). Further, the use of an amphiphilic solvent such as lower alkyl esters of lactic acid or N-methylpyrrolidone is required in WO 2013/108254. N-methylpyrrolidone is listed as a substance of very high concern in respect of being potentially carcinogenic and toxic for reproduction, methyl lactate is usually hydrolyzed to lactate and methanol in an aqueous environment. Ethyl lactate etc. is well tolerated. However due to relatively high production costs it is not a very attractive solvent, particularly not for dietary supplements.

The use of piperine as a chemosensitizing agent for a phospholipid-curcumin complex is revealed in EP 2228062 A1. An improvement of solubility is not addressed therein.

A phosphatidylcholine-based self-emulsification technique for solubilizing dietary supplements and pharmaceutically active agents has been disclosed in EP 16001941.

Another solubilization technique is the formation of inclusion complexes of the substance to be solubilized with cyclodextrins such as α-, β- or γ-cyclodextrin or cyclodextrin derivatives such as 2-hydroxypropyl-β-cyclodextrin, methyl-β-cyclodextrin or trimethyl-β-cyclodextrin. Typically, cyclodextrins are composed of 6 to 8 1,4-linked α-D-glucopyranosides forming macrocycles. Thus a water-soluble toroid (cone-shaped or bucket-shaped) structure is generated which is capable to host hydrophobic substances in its interior. The interior space is considerably less hydrophilic than the outside contacting the aqueous environment. Cyclodextrins are produced from starch by enzymatic treatment. They are loaded with the compound to be solubilized by dispersion. The compound to be solubilized can then be released by contacting these complexes with water, by pH or temperature changes, depending on the specific composition. However, the development of cyclodextrin is apparently not easy and relatively costly. This limited their use until now.

For example, Wacker Chemie offers a cyclodextrin-based curcumin solubilisate with a 40 times increased bioavailability. This effect, however, is discussed controversially. Some people suppose that it might be rather due to the concomitant use of Tween than to the cyclodextrin technology. As the health tolerance to Tween has been critically reviewed recently (see above), it might be preferable to use Tween-free solubilization techniques.

A method for enhancing the bioavailability of dosage forms of polar agents with a poor bioavailability that are administered in an enteric- or pH-sensitive coating is disclosed in AU 2014200052 A1. The problem is solved with a permeability enhancer such as glycerol and/or dimethylpalmityl-ammonio propane sulfonate (PPS).

Thus, all these techniques have their advantages but also some have drawbacks.

Therefore there is a need to provide an alternative method for solubilizing poorly water-soluble dietary supplements or pharmaceutically active agents. It should fulfil the following criteria:
  easy-to-handle
  no lengthy development time for finding a favorable composition
  well-tolerated solubilizing agents, preferably with an additional nutritional and/or health benefit
  no costly equipment needed
  inexpensive materials and production costs
  applicable for a broad range of poorly water-soluble dietary supplements or pharmaceutically active agents
  no addition of Tween solubilizers needed.

Particularly for dietary supplements the development and production costs are a serious obstacle for developing suitable solubilization techniques, as the obtainable price on the market is limited.

Surprisingly, it was found that the method according to the invention is able to solve this task.

Herein, at least one dietary supplement or pharmaceutically active agent is solubilized by the method according to the invention, comprising the following steps:

a) Providing at least one pharmaceutically active agent or dietary supplement in the overall range of 0.5% to 25% per weight at room temperature and a pressure of 0.2 bar to 1 bar;

b) Adding at least one krill oil extract in the overall range of 75% to 99.5% per weight,
  wherein the relative weight percentages of the at least one pharmaceutically active agent or dietary supplement and the at least one krill oil extract add up to 100%;

c) Cautiously heating the resulting mixture by continuously increasing the temperature with a continuous temperature increment of 0.5° C./min-3° C./min over a period of 20-60 minutes;

d) Stopping the temperature increase in a temperature range of 30° C. to 125° C. as soon as a clear solution is reached; and e) Letting the resulting solubilisate cool down to room temperature.

In a further aspect of the invention the aforementioned solubization method is characterized in that no polysorbate is used for the solubilization. In a further aspect of the invention the resulting solubilisate is characterized by being free of polysorbate.

Confusing and even contradictory definitions can be found in the art. In order to avoid any ambiguity a solubilisate according to the invention is defined as follows:

A solubilisate is the composition of the at least one substance to be solubilized and the solubilizing agents according to the invention. Further addition of a solvent or diluent shall not be covered by this term. The solubilisate according to the invention is produced first by a solubilization method according to the invention, then a specific nutritional or pharmaceutical composition is produced with said solubilisate, and finally said nutritional or pharmaceutical composition is packaged into a suitable container for the respective product.

It is characterized by the substantially complete solubilization of the substance, thus being a nearly perfect solution in which the molecules behave completely as independent entities in a solution and substantially undergo the distribution and thermodynamic rules of Brownian motion. Thus the solubilisate is a clear solution containing the respective dietary supplement or pharmaceutically active agent in a high concentration. In general, the solubilisate is not meant for intake without dilution. In most cases, a portioned solubilisate accounts to a volume of a few microliters.

In the scope of this patent application the terms "solubilization aggregate" or "solubilization essence" shall be used synonymously to "solubilisate".

A solubilisate according to the invention must be differentiated from a suspension (colloidal suspension). This term defines a heterogeneous mixture containing solid particles that sooner or later will undergo sedimentation. It is also different from an emulsion (a mixture of two liquids which usually are immiscible). For increasing the bioavailability and/or resorption of a substance the complete solubilization is highly preferably. Therefore solubilisates are preferred over suspensions or emulsions.

A solubilisate according to the invention must also be differentiated from a concentrate. A concentrate is a compound, respectively a composition of compounds without a diluent. Upon release of a concentrate into a diluent the concentrate dissolves itself either completely in the diluent or forms a suspension or emulsion with the diluent. A concentrate does not need the interaction with solubilizing agents, as it is intrinsically solvable in water or an aqueous solution.

The term solubilisate used according to the invention must be differentiated from the finished solution, respectively the prepared beverage to be imbibed. This finished solution according to the invention is generated by diluting the solubilisate according to the invention in a diluent, preferably an aqueous solution, in order to produce a beverage, respectively any fluid dosage form ready for intake by the consumer, respectively the patient.

A diluent in the scope of the present application is a diluting agent (dilutant, thinner). It is not part of the solubilisate according to the invention.

In the scope of the present application the term "solubilizing agent" refers to any chemical substance that is added to the dietary supplement or pharmaceutically active agent for solubilizing it so that the dietary supplement or pharmaceutically active agent can be solved thereupon in an aqueous solution. The term "solubilizer" shall be used synonymously.

In the scope of the present application the term "medicine" shall comprise human and veterinary medicine.

A great advantage of such a solubilisate consists in its small volume. Thus it can be easily portioned to patient- or consumer-friendly units, or relatively huge amounts of a solubilized substance can be shipped at low costs. In order to produce a finished solution the dilution of the solubilisate in an aqueous medium (e.g. tap water or mineral water) can be easily carried out by medical staff, patients or consumers.

In a preferred embodiment of the method according to the invention the at least one pharmaceutically active agent or dietary supplement is provided in the overall range of 2% to 15% per weight, in a more preferred embodiment in the overall range of 2% to 10% per weight.

Krill is the common name for small, shrimp-like crustaceans of the order Euphausiaceae, with *Euphausia superba* being the most important species. They live in dense shoals, above all in Antarctic waters. They feed mainly on phytoplankton and thus become an important member of the worldwide food chain. It is an important protein source for fish, birds and baleen whales. For economic purposes, krill can also be bred in aquacultures.

A variety of diseases in human and animals may be treated with krill-derived enzymes, such as infections, inflammations, autoimmune disorders, cancer, HIV/AIDS, pain, polyps, warts, hemorrhoids, plaque, wrinkles, thin hair, allergic itch, eye diseases, acne and cystic fibrosis.

Krill oil is extracted mainly from *Euphausia superba*. Three of the most important components in krill oil are omega-3 fatty acids, phospholipid-derived fatty acids (PLFA) and astaxanthin.

The two most abundant omega-3 fatty acids in krill oil are eicosapentaenoic acid (EPA; 20:5 (n-3); all-cis-5,8,11,14,17-eicosapentaenoic acid) and docosahexaenoic acid (DHA; 22:6 (n-3); all-cis-4,7,10,13,16,19-docosahexaenoic acid). Also amounts of stearidonic acid (SDA; 18:4 (n-3); all-cis-6,9,12,15-octadecatetraenoic acid) and docosapentaenoic acid (DPA; clupanodonic acid; 22:5 (n-3); all-cis-7,10,13,16,19-docosapentaenoic acid) were found. Further naturally occurring omega-3 fatty acids are hexadecatrienoic acid (HTA; 16:3 (n-3); all-cis-7,10,13-hexadecatrienoic acid), alpha-linolenic acid (ALA; 18:3 (n-3); all-cis-9,12,15-octadecatrienoic acid), eicosatrienoic acid (ETE; 20:3 (n-3); all-cis-11,14,17-eicosatrienoic acid), eicosatetraenoic acid (ETA; 20:4 (n-3); all-cis-8,11,14,17-eicosatetraenoic acid), heneicosapentaenoic acid (HPA; 21:5 (n-3); all-cis-6,9,12,15,18-heneicosapentaenoic acid), tetracosapentaenoic acid (24:5 (n-3); all-cis-9,12,15,18,21-tetracosapentaenoic acid), and tetracosahexaenoic acid (nisinic acid; 24:6 (n-3); all-cis-6,9,12,15,18,21-tetracosahexaenoic acid).

A broad number of positive effects on human and animal health have been described. Examples include breast and prostate cancer (Heinze and Actis, 2012, Int J Food Sci Nutr 63, 66-78), cachexia (Colomer et al., 2007, Br J Nutr 97, 823-831), prevention of cardiovascular diseases such as myocardial infarction, sudden cardiac death and stroke (Rizos et al., 2012, JAMA 308, 1024-1033), a.o. by reducing blood triglycerides, a modest lowering of blood pressure in hypertensive patients (Miller et al., 2014, Am J Hypertension 27, 885-896), a lowering of inflammation markers such as C-reactive protein, TNF-alpha and IL-6 for example in rheumatoid arthritis (Li et al., 2014, PLOS ONE 9: e88103), ADHD, autism and developmental disabilities in children (Levy and Hyman, 2005, Ment Retard Dev Disabil Res Rev 11, 131-142; Richardson, 2006, Int Rev Psychiatry 18, 155-172) as well as mental health in general, for example as an add-on in depressions as a part of bipolar disorders (Montgomery and Richardson, 2008, Cochrane database of systematic reviews: CD0055169), a slight improvement of cognitive abilities in Alzheimer's disease and mild cognitive problems (Mazereeuw et al., 2012, Neurobiol Aging 33, e17-29).

Phosphatidylcholines are a class of phospholipids linked to choline. Krill oil is particularly rich in (16:0-20:5) phosphatidylcholine and (16:0-22:6) phosphatidylcholine (Le Grandois et al., 2009, J Agric Food Chem, 57, 6014-6020). Thus the krill oil phosphatidylcholines carry particularly palmitic acid (hexadecanoic acid; 16:0), EPA (20:5) and DHA (22:6) on their phosphoglyceride backbone. In total, 69 species of choline-containing phospholipid molecules could be identified in a GC/MS analysis of krill oil. A typical phosphatidylcholine content in a krill oil is 34 wt-% (Winther et al., 2011, Lipids 46, 25-36).

These krill oil phosphatidylcholines have been associated with a number of health promoting effects. In clinical studies they improved the blood lipid composition in dyslipidemia and chronic liver diseases, changed the endocannabinoid levels in obese persons, reduced arthritic symptoms in arthritic diseases and reduced oxidative damage in athletes and dysmenorrhea in affected women, world recall tasks were improved in patients with memory disorders and attention could be increased in ADHD children (cf. Burn et al., 2012, J Mol Sci 13, 15401-15419).

Astaxanthin is a keto-carotenoid that belongs to the chemical group of terpenes and can be found in microalgae, salmon, trout, yeast and crustaceans like krill, shrimp and crayfish. It is a metabolite of zeaxanthin and/or canthaxanthin, and is a colorful, lipophilic pigment, bestowing the reddish color to many of the aforementioned organisms. Due to its long chain of conjugated double bonds it acts as an antioxidant. Therefore it is used as a food supplement for humans and animals, and it is added to aquacultures. Another use is that of a food dye (E161). Some reports suggest a beneficial role in cardiovascular, inflammatory, autoimmune and neurodegenerative diseases (Fassett and Coombes, 2009, Future Cardiol 5, 333-342; Kidd, 2011, Altern Med Rev 16, 355-364). It is assumed that it suppresses NF-κB activation. A typical astaxanthin content in a krill oil is 0.1-1.5 mg/ml (Guerin et al., 2003, Trends Biotechnol 21, 210-216; Lennikov et al., 2012, Molecular Vision 18, 455-464).

Taken together, the krill oil extract of the invention does not act only as a solubilizer but provides a broad range of beneficial health effects itself, respectively supports the beneficial actions of the dietary supplements and/or pharmaceutically active agents to be solubilized. To our knowledge, such an effect of a solubilizer has not been described yet.

The method according to the invention is usually started at room temperature. However, in alternative embodiments it may be also possible to preheat either the at least one pharmaceutically active agent or dietary supplement or any of the solubilizing agents to be added in step b) of the inventive method, provided that the preheating temperature does not exceed 28° C.

The method according to the invention can be performed at a pressure of 0.2 bar to 1 bar. It is preferred, however, to run the method at 1 bar (atmospheric pressure). For certain applications it may be preferable to use a light vacuum. The technical equipment for applying, maintaining and controlling such a light vacuum is well known in the art.

According to the method of the invention the resulting mixture is cautiously heated in step c) by continuously increasing the temperature over a period of 20-60 minutes. In preferred embodiments this period is 25-40 minutes, and most preferred 30-35 minutes.

An essential feature of the method according to the invention is the temperature control (temperature increment per time and duration of the heating). While there is a variability in the relative amounts of the solubilizing agents the controlled temperature increase is essential. Apparently, there is an optimal window for each substance to be solubilized. The exact values are difficult to predict, they have to be found out empirically. It is assumed that there is also an interdependency with the selected solubilizing agents and their relative amounts.

The continuous temperature increment (the steepness of the temperature ramp) can vary between 0.5° C./min to 3° C./min, preferred 1° C./min to 2° C./min and most preferred 2° C./min.

According to step d) the temperature increase is stopped in a temperature range of 30° C. to 125° C. as soon as a clear solution is reached. This moment depends heavily on the selected dietary supplement or pharmaceutically active agent as well as on the selected solubilization agents and reaction conditions. Apparently, it is not possible to foretell this "solubilizing temperature" on the basis of the specific components that are going to be used. Each composition of these components displays specific characteristics which have to be found out experimentally. Thus it becomes to the experimenter to find out the optimal combination of these parameters.

It is understood that the method according to the invention can be varied in such a way that any of the solubilizing agents of step b) can be provided first and then the at least one dietary supplement or pharmaceutically active agent as well as the other solubilizing agents can be added in any sequence. It is also possible to provide a mixture of the solubilizing agents of step b) first and then add the at least one dietary supplement or pharmaceutically active agent. This variation was found to be neutral to the outcome of the method according to the invention.

In a preferred embodiment said mixture of the solubilizing agents of step b) and said at least one dietary supplement or pharmaceutically active agent are provided in a two-compartment system. This may facilitate the solubilization process according to the invention and each compartment can be marketed separately. For certain dietary supplements or pharmaceutically active agents this can be advantageous for the stability and thus for the shelf life of the solubilisate or the finished solution according to the invention.

The moment when the resulting solubilisate has become a clear solution is determined by observation of the experimenter. In general, this moment is achieved when the solution appears transparent and does not display any sedimentation, precipitation, slurs, smears or striping (zebra effect).

In an alternative embodiment the parameters for the temperature ramp according to the invention that have been determined as described before can be implemented in an automatized or half-automatized device setting. This may be advantageous, for example, in an upscale industrial application.

The solubilisates produced according to the method of the invention maintain this clearness upon cooling down and stay clear and stable upon being stored. The achievable storage time (roughly corresponding to the shelf life time of a product) is apparently not limited. In preliminary stability analyses there was no solubilisate according to the invention where the minimum storage time was less than 4 weeks. In some cases even a storage time of minimum 16 months could be assessed (see Ex. 5).

In a further aspect of the invention the method of the invention can be combined with one or more additional solubilizing agents or pharmaceutically acceptable excipients, respectively food additives. This at least one additional solubilizing agent can be selected from a group comprising phosphatidylcholines, lysophosphatidylcholines, medium-chained triglycerides, $C_2$ to $C_4$ alcohols, glyceryl stearate, saturated or unsaturated $C_{14}$ to $C_{20}$ fatty acids and antioxidants. Corresponding to their overall relative weight percentage the weight percentage of the at least one krill oil extract is diminished.

Phosphatidylcholines are a class of phospholipids linked to choline. They are a major component of cell membranes and are for example obtained from egg yolk, ox liver, marine animals or soybeans. In practice, it showed that the origin of phosphatidylcholines influences their biological and chemical effects considerably. According to the invention the at least one phosphatidylcholine (PC) can be selected from the group comprising 1-palmitoyl-2-oleoyl-sn-glycero-3-phosphocholine (POPC), natural (non-hydrogenated) soy bean PC, natural egg PC, dipalmitoyl phosphatidylcholine (DPPC), dimyristoyl phosphatidylcholine (DMPC) or 1,2-dioleyl-SN-glycero-3-phosphocholine (DOPC), 1-oleoyl-palmitoyl phosphatidylcholine (OPPC), diasteroyl phosphatidylcholine (DSPC), monostearoylphosphatidylcholine (MSPC), diarachidoylphosphatidylcholine (DAPC), corn lecithin, cottonseed oil lecithin, rapeseed lecithin, phosphatidylethanolamine, phosphatidylserine, phosphatidylinositol, phosphatidylinositol polyphosphates, phosphatidylglycerol, phosphatidic acid, phosphatidylinositolamine, diphosphatidylglycerol (cardiolipin), sphingomyelin, ceramide aminoethylphosphonic acid, ceramide phosphorylglycerol, dicetylphosphoric acid, stearylamine, and mixtures thereof. Preferred phosphatidylcholines are non-hydrogenated phosphatidylcholines. Particularly preferred phosphatidylcholines are non-hydrogenated soybean PC, DMPC, POPC and DOPC. Most preferred is non-hydrogenated soybean PC.

Lecithin is commonly used as a synonym for phosphatidylcholines. It is a mixture of phosphatidylcholine and other compounds.

Phosphatidylcholines can be added in the overall range of 0.5% to 24.5% per weight.

Lysophosphatidylcholines (LPC, lysoPC, also: lysolecithins) are a class of derivatives of phosphatidylcholines, resulting of their partial hydrolysis in which one of the fatty acid groups is removed. In the organism this hydrolysis is effected by the enzyme phospholipase A2. According to the invention the at least one lysophosphatidylcholine can be selected independently from one another from the group comprising all hydrolyzed compounds of the phosphatidylcholines listed above, 1-lysophosphatidylcholines (2-acyl-sn-glycero-3-phosphocholines), 2-lysophosphatidylcholines, L-alpha-lysophosphatidylcholine, and mixtures thereof.

According to the method of the invention lysophosphatidylcholines are used in the overall range of 0.5% to 10% per weight.

Medium-chained triglycerides (MCT) refer to triglycerides whose fatty acids have an aliphatic tail of 6-12 carbon atoms. Fatty acids incorporated in MCT are called medium-chain fatty acids (MCFA). In triglycerides three fatty acid molecules are bound to a glycerol backbone. Per definition, in MCT at least two of these three fatty acids must be MCFAs. According to the invention MCFA can be selected independently from one another from the group comprising caproic acid, enanthic acid, caprylic acid, pelargonic acid, capric acid, undecilyc acid, lauric acid, their unsaturated derivatives, and mixtures thereof. Preferred MCFA are caproic acid, caprylic acid, capric acid, and lauric acid.

It can be advantageous in some embodiments of the invention to use triglycerides containing 1 to 3 myristic acid and/or palmitic acid residues instead of MCFAs. Hence, these two fatty acids shall be subsumed under the term MCT according to the invention too.

MCT oils or MCT fats are oils or fats containing predominantly said MCT. These terms refer to a respective mixture of different MCT that may contain a variety of MCFA. According to the invention any reasonable mixing ratio shall be covered by these terms. MCT fats are often extracted from specific plant fats, while MCT oils do not occur naturally. MCT oils and MCT fats are broadly marketed as a healthy dietary supplement, respectively as a surrogate for long-chain fats in nutrition.

According to the method of the invention MCT are used in the overall range of 0.5% to 24.5% per weight.

The at least one $C_2$ to $C_4$ alcohol (lower alcohol) can be selected from the group comprising ethanol, propanol, isopropanol, butane-1-ol, butane-2-ol, isobutanol (2-methyl-1-propanol), ethylene glycol (ethane-1,2-diol), α-propylene glycol (propane-1,2-diol), β-propylene glycol (propane-1-3-diol), 1,2-butylene glycol (butane-1,2-diol), 1,3-butylene glycol (butane-1,3-diol), 1,4-butylene glycol (butane-1,4-diol), and diethylene glycol. Preferred is ethanol.

$C_2$ to $C_4$ alcohols can be used in the overall range of 0.5% to 5% per weight.

Glyceryl stearate (glycerol monostearate, GMS) is an emulsifier. The flaky powder is also hygroscopic. GMS is used as thickening, emulsifying, anti-caking, anti-staling and preservative agent.

At least one saturated or unsaturated $C_{14}$ to $C_{20}$ fatty acid can be used instead of or in combination with glyceryl stearate. It can be selected from the group comprising myristic acid (14:0), pentadecanoic acid (15:0), palmitic acid (16:0), heptadecanoic acid (17:0), stearic acid (18:0), nonadecanoic acid (19:0), arachidic acid (20:0), myristoleic acid (14:1,cis-$\Delta^9$), palmitoleic acid (16:1, cis-$\Delta^9$), sapienic acid (16:1, cis-$\Delta^6$), hexadecatrienoic acid (16:3, (n-3), oleic acid (18:1, cis-$\Delta^9$), elaidic acid (18:1, trans-$\Delta^9$), vaccenic acid (18:1, trans-$\Delta^{11}$), linoleic acid (18:2; cis,cis-$\Delta^9,\Delta^{12}$), linoleadic acid (18:2, trans,trans-$\Delta^9,\Delta^{12}$), α-linolenic acid (18:3, cis,cis,cis-$\Delta^9,\Delta^{12},\Delta^{15}$), γ-linolenic acid (18:3, (ω-3)), calendic acid (8E,10E,12Z-octadecatrienoic acid), stearidonic acid (18:4 (n-3)), dihomo-γ-linolenic acid (20:3; (ω-6)), eicosadienoic acid (20:2, (n-6)), eicosatrienoic acid (20:3, (n-3)), eicosatetraenoic acid (20:4, (n-3)), arachidonic acid (20:4, cis,cis,cis,cis-$\Delta^5,\Delta^8,\Delta^{11},\Delta^{14}$) eicosapentaenoic acid (20:5, cis,cis,cis,cis,cis-$\Delta^5,\Delta^8,\Delta^{11},\Delta^{14},\Delta^{17}$). Preferred are even-numbered $C_{14}$ to $C_{20}$ fatty acids. Particularly preferred is oleic acid.

Glyceryl stearate and/or a saturated or unsaturated $C_{14}$ to $C_{20}$ fatty acid can be used in the overall range of 0.5% to 3% per weight.

For augmenting the shelf life of solubilisates containing at least one oxidation-prone dietary supplement or pharmaceutically active agent at least one further antioxidant can be added to the solubilisate. In preferred embodiments this at least one antioxidant is a food additive and/or a pharmaceutically acceptable excipient. Suitable antioxidants can be selected from the group comprising lactic acid, ascorbic acid, sodium ascorbate, calcium ascorbate, potassium ascorbate, fatty acid esters of ascorbic acid, ascorbyl palmitate, ascorbyl stearate, tocopherols, alpha-tocopherol, beta-tocopherol, gamma-tocopherol, delta-tocopherol, alpha-tocotrienol, beta-tocotrienol, gamma-tocotrienol, delta-tocotrienol, propyl gallate, octyl gallate, dodecyl gallate, ethyl gallate, guaiac resin, erythorbic acid, sodium erythorbate, erythorbin acid, sodium erythorbin, tert-butylhydroquinone, butylated hydroxyanisole, butylated hydroxytoluene, mono-, di-, trisodium phosphate, mono-, di-, tripotassium phosphate, anoxomer, ethoxyquin, potassium lactate, stannous chloride, sodium thiosulfate, 4-hexylresorcinol, glucose oxidase. Preferred are ascorbyl palmitate and alpha-tocopherol, beta-tocopherol, gamma-tocopherol, delta-tocopherol. Particularly preferred is a combination of ascorbyl palmitate and at least one of alpha-tocopherol, beta-tocopherol, gamma-tocopherol, delta-tocopherol.

The term tocopherol refers to any of the aforementioned tocopherols or a mixture thereof.

Preferred are ascorbyl palmitate and/or at least one tocopherol.

This at least one antioxidant can be added to said solubilisate or Its preferred embodiments in the overall range of 0.01% to 3% per weight.

The quality and thus the usefulness of krill oil extracts can vary in a certain range because of different origins, species composition, extraction methods, producers etc. Herein the phosphatidylcholine content of the krill oil extract is one key feature. Therefore in a preferred embodiment the at least one krill oil extract has a phosphatidylcholine content greater than 40% per weight, more preferred greater than 45% per weight.

Another important aspect for the quality of the krill oil extract is the extraction technique. Cold extraction allows for extraction in one step. Optionally, a filtering of the extract ensues. Particularly in cold-extracted oils all ingredients of the oil are conserved. This influences quality criteria such as taste, smell, color and vitamin content. Standard cold extraction procedures are known to a person skilled in the art. Therefore it is preferred that the krill oil extraction is carried out at temperatures <25° C., more preferred <15° C. and most preferred <5° C.

Thus the present application refers also to a method for solubilizing a pharmaceutically active agent or a dietary supplement, comprising the following steps:

a) Providing at least one pharmaceutically active agent or dietary supplement in the overall range of 0.5% to 25% per weight at room temperature and a pressure of 0.2 bar to 1 bar;

b) Adding at least one krill oil extract in the overall range of 75% to 99% per weight, and
at least one of
phosphatidylcholines in the overall range of 0.5% to 24.5% per weight,
lysophosphatidylcholines in the overall range of 0.5% to 10% per weight,
medium-chained triglycerides in the overall range of 0.5% to 24.5% per weight,
$C_2$ to $C_4$ alcohols in the overall range of 0.5% to 5% per weight,
glyceryl stearate in the overall range of 0.5% to 3% per weight,
saturated or unsaturated $C_{14}$ to $C_{20}$ fatty acids in the overall range of 0.5% to 3% per weight, and
antioxidants in the overall range of 0.01% to 3% per weight,
wherein the relative weight percentages of the at least one pharmaceutically active agent or dietary supplement and the at least one krill oil extract add up to 100%;

c) Cautiously heating the resulting mixture by continuously increasing the temperature with a continuous temperature increment of 0.5° C./min-3° C./min over a period of 20-60 minutes;

d) Stopping the temperature increase in a temperature range of 30° C. to 125° C. as soon as a clear solution is reached; and e) Letting the resulting solubilisate cool down to room temperature.

Thus the present application refers also to the solubilisate resulting from any of the aforementioned solubilizing methods according to the invention:

A solubilisate of at least one pharmaceutically active agent or dietary supplement, comprising at least one pharmaceutically active agent and/or dietary supplement in the range of 0.5% to 25% per weight and at least one krill oil extract in the overall range of 75% to 99.5% per weight, wherein the relative weight percentages of all ingredients add up to 100%.

In a preferred embodiment the solubilisate according to the invention comprises at least one pharmaceutically active agent and/or dietary supplement in the range of 2% to 15% per weight and at least one krill oil extract in the overall range of 85% to 98% per weight, wherein the relative weight percentages of all ingredients add up to 100%.

In a further preferred embodiment the solubilisate according to the invention comprises at least one pharmaceutically active agent and/or dietary supplement in the range of 5% to 10% per weight and at least one krill oil extract in the overall range of 90% to 95% per weight, wherein the relative weight percentages of all ingredients add up to 100%.

According to the invention said solubilisate or its preferred embodiments may additionally contain an antioxidant as listed before in the overall range of 0.01% to 10% per weight, preferred 0.1% to 5% per weight, more preferred 0.2% to 1% per weight and most preferred 0.3% to 0.5% per weight.

In a particularly preferred embodiment of this solubilisate the optionally added at least one saturated or unsaturated $C_{14}$ to $C_{20}$ fatty acid is oleic acid.

In a particularly preferred embodiment of this solubilisate the optionally added at least one $C_2$ to $C_4$ alcohol is ethanol.

In a further aspect of the invention all of the aforementioned solubization methods including further ingredients are characterized in that no polysorbate is used for the solubilization. All of the resulting solubilisates are characterized by being free of polysorbate.

According to the invention a dietary supplement can be the compound to be solubilized. Thus all dietary supplements can be solubilized by the method according to the invention. The inventive method is particularly suitable for the solubilization of poorly water-soluble dietary supplements. Poor water solubility often coincides with a poor bioavailability. For dietary supplements, which are usually consumed orally, the term bioavailability defines the quantity or fraction of the ingested dose that is absorbed. Thus it is preferred that a dietary supplement having a poor bioavailability is used for the production of the solubilisate according to the invention. It is preferred that their bioavailability in application forms according to the state-of-the-art is less than 50%, more preferred less than 40%, more preferred less than 30%, even more preferred less than 20%, particularly preferred less than 15% and most preferred less than 10%.

Dietary supplements are defined as nutrients provided to a consumer that otherwise may not be consumed in a sufficient quantity. It also refers to compounds that may generally improve a person's health condition without being intended as a therapeutic means for a disease. Therefore different regulatory requirements exist for dietary supplements and pharmaceutical drugs in almost all countries. According to the invention, these dietary supplements shall be used exclusively for nutritional purposes in substantially healthy persons. Any possible therapeutic use in a patient in need thereof or double use shall not be covered by the term dietary supplement.

Often dietary supplements include not only one defined compound. They are provided in the form of plant extracts.

Therefore in the scope of this patent application the term dietary supplements refers also to plant extracts intended for an exclusively dietary use.

Examples for compounds or plant extracts used as dietary supplements known to have a poor bioavailability are, without being limiting: Flavones, flavonols, flavon-3-ols, flavonones, flavonoids, resveratrol, turmeric, quercetin, ellagic acid, naringenin, betulin, betulinic acid, folic acid (folate), ubiquinone (Q10, coenzyme Q), glutathione, eicosapentaenoic acid (EPA), docosahexaenoic acid (DHA), uridine, chromium dichloride, L-carnitine, ursolic acid, catechin, epicatechin, epigallocatechin (EGC), epigallocatechin gallate (EGCG), epicatechin gallate (ECG), polyphenols, berberin, melatonin, polydatin, isoflavones, liposoluble vitamins A (retinol, retinal), D, E (tocopherols), F, K, α- and β-keto-boswellic acid, L-tryptophan, 5-hydroxytryptophan, L-glycine, inositol, β-carotene, tocotrienols, ascorbyl palmitate, lecithin, lutein, luteolin, lycopene, zeaxanthin, β-cryptoxanthin, red clover, saw palmetto lipid extract, ω-3 fatty acids, steroidal terpenes, non-steroidal terpenes, terpenoids; saponins, sapogenins, diosgenin, *Dioscorea* spec. extract, *Dioscorea villosa* extract, protodioscin, *Tribulus terrestris* extract, essential oils, hypericin, xanthorhizol, pyrogallol, genistein, wogonin, morin, kaempferol, *Bacopa monneri* extract, bacopin, bacoside A, bacoside A3, bacoside B, xanthorhizol, ginseng extract, *Gingko biloba* extract, pycnogenol, capsaicin, *Rubia cordifolia* extract, *Lawsennia iermis* extract, Aloe vera extract, piperin, α-lipoic acid, bromelain, phlorizin, crocin, crocetin, bioperine, acerola, proanthocyanidins, anthocyanidins, aglycones of anthocyanins silibinin, silymarin, gingerol, zingiberene, zingiberol, shogaol, diarylheptanoids, ceramides, isoprene, prenol, isovaleric acid, geranyl pyrophosphate, eucalyptol, limonene, pinene, farnesyl pyrophosphate, artemisinin, bisabolol, geranylgeranyl pyrophosphate, phytol, taxol, forskolin, aphidicolin, squalene, lanosterol, oils, such as shark or other cartilaginous fish oils, vegetable oils, or oils from amaranth seed, rice, wheat germ or olives; squalenes, retinoids, tannins, cinnamic acid, lignins, as well as phytosterols such as β-sitosterol laurate ester, α-sitosterol laurate ester, γ-sitosterol laurate ester, campesterol myristearate ester, stigmasterol oleate ester, campesterol stearate ester, β-sitosterol oleate ester, β-sitosterol palmitate ester, β-sitosterol linoleate ester, α-sitosterol oleate ester, γ-sitosterol oleate ester, β-sitosterol myristearate ester, β-sitosterol ricinoleate ester, campesterol laurate ester, campesterol ricinoleate ester, campesterol oleate ester, campesterol linoleate ester, stigmasterol linoleate ester, stigmasterol laurate ester, stigmasterol caprate ester, α-sitosterol stearate ester, γ-sitosterol stearate ester, α-sitosterol myristearate ester, γ-sitosterol palmitate ester, campesterol ricinoleate ester, stigmasterol ricinoleate ester, campesterol ricinoleate ester, α-sitosterol, β-sitosterol, γ-sitosterol, campesterol, stigmasterol, and stigmasterol stearate ester; extracts from adaptogenic plants such as Eleutherococcus senticosus (Siberian ginseng, eleuthero, ciwujia), *Rhodiola rosea* (rose root), *Schisandra chinensis* (five flavor berry), *Panax ginseng* (ginseng), *Gynostemma pentaphyllum* (Jiao Gu Lan), *Morinda citrifolia* (noni, Indian mulberry), *Lentinula edodes* (shiitake), *Ganoderma* spec. (reishi, lingzhi mushroom) such as *Ganoderma lucidum, Ganoderma tsugae* and *Ganoderma sichuanense, Grifola frondosa* (maitake mushroom, hen-of-the-woods), *Agaricus* spec. (almond mushroom) such as *Agaricus subrufescens* and *Agaricus blazei Murill, Withania somnifera* (ashwagandha, winter cherry), *Ocimum tenuiflorum* (tulsi, holy basil), *Lepidum meyenii* (maca), *Andrographis paniculata* (kalmegh), *Tabebuia impetiginosa* (lapacho), *Astragalus membranaceus* (astragalus, tragacanth).

In preferred embodiments bioperine (piperine, an extract from black pepper) can be added to further increase the bioavailability of the solubilized dietary supplement.

Thus the present application refers also to the solubilisate according to the invention for use in a dietary supplement preparation, wherein at least one dietary supplement is solubilized in said solubilisate.

According to the invention a pharmaceutically active agent (drug substance) can be the compound to be solubilized. The inventive method is particularly suitable for the solubilization of poorly water-soluble pharmaceutically active agents.

The internationally accepted BCS (Biopharmaceutical Classification System) classifies drug substances into four classes: Class 1 (high solubility—high permeability), Class 2 (low solubility—high permeability), Class 3 (high solubility—low permeability and Class 4 (low solubility—low permeability).

Herein the term solubility refers to the highest dose strength that is subject to an FDA biowaiver request. Herein, a drug is classified as highly soluble, when the highest dose strength is soluble in 250 ml or less of aqueous media over the pH range of 1-7.5. Correspondingly, drug substances that can't be solubilized that way are classified as poorly soluble.

Herein the term permeability refers to the extent of absorption of a drug in humans across the intestinal membrane (mucosa). According to the established definition a drug is classified as highly permeable if 90% or more of the orally administered dose are resorbed in the gastrointestinal tract. Correspondingly, a drug having an absorption rate of less than 90% is classified as low permeable.

Thus solubility and permeability are intrinsic substance properties. Resorption and bioavailability, however, describe pharmaceutic parameters that may be improved by suitable measures. Bioavailability is defined differently for pharmaceutically active agents. While resorption refers to the fraction from the orally applied substance amount that is absorbed from the gastrointestinal tract the bioavailability of a substance depends not only from resorption but also from species-specific protein binding in blood and from pharmacokinetic parameters such as first-pass metabolism.

According to a preferred embodiment of the invention pharmaceutical drugs having a poor solubility as defined above are used for the production of a solubilisate.

According to the invention it is preferred that pharmaceutical drugs having a poor permeability as defined above are used for the production of a solubilisate.

According to the invention it is particularly preferred that pharmaceutical drugs having a poor solubility as well as a poor permeability as defined above are used for the production of a solubilisate (Class 4 compounds).

Examples for Class 4 pharmaceutical drugs, without being limiting, are: acetaminophen (paracetamol), aciclovir, azathioprine, azithromycin, calcitriol, carisoprodol, cefdinir, cefixime, cefuroxime axetil, cephalexin, chlorothiazide, chlorthalidone, clarithromycin, cyclosporine, dapsone, dexamethasone, dronabinol, dutasteride, furosemide, glipizide, griseofulvin, hydrochlorothiazide, indinavir sulfate, isradipine, linezolid, loperamide, mebendazole, mercaptopurine, mesalamine, methylprednisolone, modafinil, nabumetone, nelfinavir mesylate, norelgestromin, nystatin, oxcarbazepine, oxycodone HCl, progesterone, pyrimethamine, ritonavir, spironolactone, sulfamethoxazole, trimethoprim, taladafil.

Thus, the present application refers also to a solubilisate according to the invention for use in a pharmaceutical dosage form, wherein at least one pharmaceutically active agent is solubilized in said solubilisate.

Moreover, the present application refers also to the use in medicine of a solubilisate according to the invention. In particular, it refers to said use in a pharmaceutical dosage form.

As laid out before, one goal of the solubilisate according to the invention is to enable an augmented resorption and/or bioavailability of the dietary supplement or pharmaceutically active agent solubilized in said solubilisate. Thus, the present application refers also to a solubilisate according to the invention, in which the solubilisate of the at least one dietary supplement and/or pharmaceutically active agent enhances the resorption and/or bioavailability of at least one of said dietary supplements or pharmaceutically active agents.

A further aspect of the invention is that some pharmaceutical drugs or dietary supplements intrinsically have a bitter or unpleasant taste. In case of pharmaceutical drugs this may seriously impair patient compliance, in case of dietary supplements such a taste may be a serious commercialization obstacle. A solubilisate according to the invention can significantly help to mask this bitter or unpleasant taste by caging the substance.

Thus the present invention relates also to a solubilisate of a pharmaceutical drug or dietary supplement for use to mask a bitter or unpleasant taste of the pharmaceutical drug or dietary supplement. To this aim, a solubilisation method according to the invention is used.

Examples of pharmaceutical drugs with a bitter or unpleasant taste comprise, without being limiting, acetaminophen, albuterol, aminoguanidine hydrochloride, aminophylline, amitriptyline, amoxicillin trihydrate, ampicillin, amlodipine besylate, aspirin, azithromycin, barbiturates, berberin chloride, caffeine, calcium carbonate, calcium pantothenate, cephalosporins, cetirizine, chloramphenicol, chlordiazepoxide, chloroquine, chlorpheniramine, chlorpromazine, cimetidine, ciprofloxacin, clarithromycin, codeine, demerol, dextromethorphan, digitoxin, digoxin, diltiazem hydrochloride, diphenhydramine, diphenylhydantoin, doxazosin mesylate, doxylamine succinate, eletriptan, enoxacin, epinephrine, erythromycin, ethylefrine hydrochloride, etinidine, famotidine, fluconazole, glipizide, guaifenesin, ibuprofen, indeloxazine hydrochloride, lidocaine, lomotil, loratadine, lupitidine, magnesium oxide, meclizine, methacholine, morphine, neostigmine, nifentidine, niperotidine, nizatidine, ofloxacin, paracetamol, pefloxacin, penicillin, phenobarbital, phenothiazine, phenylbutazone, phenylpropanolamine, pipemidic acid, pirbuterol hydrochloride, piroxicam, prednisolone, propranolol hydrochloride, pseudoephedrine, pyridonecarboxylic acid antibacterials, ranitidine, roxatidine, salicylic acid, sertraline hydrochloride, sildenafil, spironolactone, sulbactam sodium, sulfonamides, sulfotidine, sulpyrine, sultamicillin tosylate, tenidap, terfenadine, theophylline, trimethoprim, tuvatidine, valdecoxib, zaltidine, and zonisamide.

In a preferred embodiment the solubilisate according to the invention contains a poorly soluble pharmaceutical agent with a bitter or unpleasant taste. In another preferred embodiment the solubilisate according to the invention contains a pharmaceutical agent with a low permeability having a bitter or unpleasant taste. In a particularly preferred embodiment the solubilisate according to the invention contains a BCS Class 4 pharmaceutical drug with a bitter or unpleasant taste. Suitable examples comprise acetaminophen (paracetamol), azithromycin, clarithromycin, glipizide and trimethoprim.

Many dietary supplements have also a bitter or unpleasant taste, in particular many phytochemicals such as alkaloids, tannins, phenolic or polyphenolic compounds, flavonoids, isoflavones, isoflavone glucosides, glucosinolates, isothiocyanates, cucurbitacins, oxygenated tetracyclic triterpenes.

In most cases, the solubilisate itself is not yet a dietary supplement preparation or pharmaceutical dosage form. To be ready for consumption, respectively intake the solubilisate is solved in a diluent. The preferred diluent for oral consumption or oral dosage forms is water. Therefor the solubilisate according to the invention is added to an aqueous solution in a suitable container. The container can be selected from a group comprising, but not limited to, bottles, flasks, vials, flacons, ampules, glasses, cups, drinking bowls, beverage cartons, Tetra Pak®, cans, canteens, mugs having a lid, steins having a lid, pouches, stand-up pouches, barrels, kegs, wineskins, hose-shaped containers and custom-built two- or multiple-compartment containers. Preferred containers are bottles, vials and beverage cartons.

It is preferred that the container with the aqueous solution and the solubilisate solved therein is shaken several times to ensure a homogeneous distribution of the solubilisate in the aqueous solution and by this way a uniform taste, a constant concentration, avoidance of slurs and an appealing presentation of the finished solution.

Thus the present application refers also to a finished solution, wherein the solubilisate according to the invention is solved in an aqueous solution.

Moreover, the present application refers also to a pharmaceutical composition containing at least one pharmaceutically active agent formulated in a solubilisate according to the invention or in a finished aqueous solution as defined before, and at least one pharmaceutically acceptable excipient. It is preferred that that the pharmaceutical composition is an oral dosage form.

The term "pharmaceutical excipients" refers to natural or synthetic compounds that are added to a pharmaceutical formulation alongside the pharmaceutical active agent. They may help to bulk up the formulation, to enhance the desired pharmacokinetic properties or the stability of the formulation, as well as be beneficial in the manufacturing process. Advantageous classes of excipients according to the invention comprise carriers, binding agents, colorants, buffers, preservatives, emulsifiers, diluents, pH-regulators, solvents, isotonizing agents, sweeteners, acidifiers, thickening agents, fillers, flavor enhancers, opacifiers, flavoring substances and aromatic substances.

It can be advantageous, respectively mandatory to add one or more pharmaceutically acceptable carrier to a pharmaceutically active agent. Eligible are all carriers known in the art and combinations thereof. In solid dosage forms they can be for example plant and animal fats, waxes, paraffins, starch, tragacanth, cellulose derivatives, polyethylene glycols, silicones, bentonites, silica, talcum, zinc oxide. For liquid dosage forms and emulsions suitable carriers are for example solvents, solubilizing agents, emulsifiers such as water, ethanol, isopropanol, ethyl carbonate, ethyl acetate, benzyl alcohol, benzyl benzoate, propylene glycol, 1,3-butyl glycol, cotton seed oil, peanut oil, olive oil, castor oil, sesame oil, glycerol fatty acid esters, polyethyl glycols, fatty acid esters of sorbitan. Suspensions according to the invention may use carriers known in the art such as diluents (e.g. water, ethanol or propylene glycol), ethoxylized isostearyl alcohols, polyoxyethylene and polyoxyethylene sorbitan esters, microcrystalline cellulose, bentonites, agar agar, tragacanth.

The term binding agents refers to substances that bind powders or glue them together, rendering them cohesive through granule formation. They serve as a "glue" of the formulation. Binding agents increase the cohesive strength of the provided diluent or filler.

Suitable binding agents are for example starch from wheat, corn, rice or potato, gelatine, naturally occurring sugars such as glucose, sucrose or beta-lactose, sweeteners from corn, natural and synthetic gums such as acacia, tragacanth or ammonium calcium alginate, sodium alginate, carboxymethyl cellulose, sodium carboxymethyl cellulose, hydroxypropyl carboxymethyl cellulose, polyethylene glycol, polyvinyl pyrrolidone, magnesium aluminum silicate, waxes and others. The percentage of the binding agent in the composition can range from 1-30% by weight, preferred 2-20% by weight, more preferred 3-10% by weight and most preferred 3-6% by weight.

In some embodiments it may be desirable that the prepared beverage generates some foam on being dissolved. Such an effect can be supported through the addition of a foaming agent that reduces the surface tension of the liquid, thus facilitating the formation of bubbles, or it increases its colloidal stability by inhibiting coalescence of bubbles. Alternatively, it may stabilize foam. Suitable examples include mineral oil, quillaia extract, triethyl citrate, sodium lauryl ether sulfate, sodium lauryl sulfate, ammonium lauryl sulfate.

Alternatively, some solubilisates according to the invention may appear slightly foamy upon preparation. Though this does not interfere with the desired application it may affect patient compliance in case of a medication or the commercial success in case of dietary supplements. Therefore it may be desirable to add a pharmaceutically or nutritionally acceptable anti-foaming agent (defoamer) to the solubilisate. Examples are polydimethylsiloxane or silicone oil in dietary supplements or simethicone in pharmaceuticals.

Colorants are excipients that bestow a colorization to the composition of the drink, respectively the dosage form. These excipients can be food colorants. They can be adsorbed on a suitable adsorption means such as clay or aluminum oxide. The amount of the colorant may vary between 0.01 and 10% per weight of the composition, preferred between 0.05 and 6% per weight, more preferred between 0.1 and 4% per weight, most preferred between 0.1 and 1% per weight.

Suitable food or pharmaceutical colorants are for example riboflavin, riboflavin-5'-phosphate, tartrazine, alkannin, quinolione yellow WS, Fast Yellow AB, riboflavin-5'-sodium phosphate, yellow 2G, Sunset yellow FCF, orange GGN, cochineal, carminic acid, citrus red 2, carmoisine, amaranth, Ponceau 4R, Ponceau SX, Ponceau 6R, erythrosine, red 2G, Allura red AC, lndathrene blue RS, Patent blue V, indigo carmine, Brilliant blue FCF, chlorophylls and chlorophyllins, copper complexes of chlorophylls and chlorophyllins, Green S, Fast Green FCF, Plain caramel, Caustic sulphite caramel, ammonia caramel, sulphite ammonia caramel, Black PN, Carbon black, vegetable carbon, Brown FK, Brown HT, alpha-carotene, beta-carotene, gamma-carotene, annatto, bixin, norbixin, paprika oleoresin, capsanthin, capsorubin, lycopene, beta-apo-8'-carotenal, ethyl ester of beta-apo-8'-carotenic acid, flavoxanthin, lutein, cryptoxanthin, rubixanthin, violaxanthin, rhodoxanthin, canthaxanthin, zeaxanthin, citranaxanthin, astaxanthin, betanin, anthocyanins, saffron, calcium carbonate, titanium dioxide, iron oxides, iron hydroxides, aluminum, silver, gold, pigment rubine, tannin, orcein, ferrous gluconate, ferrous lactate.

Flavor enhancers are widely used for food and drinks. Suitable examples are glutamic acid, monosodium glutamate, monopotassium glutamate, calcium diglutamate, monoammonium glutamate, magnesium diglutamate, guanylic acid, sodium guanylate, disodium guanylate, dipotassium guanylate, calcium guanylate, inosinic acid, disodium inosinate, dipotassium inosinate, calcium inosinate, calcium 5'-ribonucleotides, disodium 5'-ribonucleotides, glycine, sodium glycinate, zinc acetate, gum benzoic, thaumatin, glycyrrhizin, neohesperidine dihydrochalcone, glyceryl monoacetate, glyceryl diacetate.

Moreover, buffer solutions are preferred for liquid formulations, in particular for pharmaceutical liquid formulations. The terms buffer, buffer system and buffer solution, in particular of an aqueous solution, refer to the capacity of the system to resist a pH change by the addition of an acid or a base, or by dilution with a solvent. Preferred buffer systems may be selected from the group comprising formate, lactate, benzoic acid, oxalate, fumarate, aniline, acetate buffer, citrate buffer, glutamate buffer, phosphate buffer, succinate, pyridine, phthalate, histidine, MES (2-(N-morpholino) ethanesulfonic acid, maleic acid, cacodylate (dimethyl arsenate), carbonic acid, ADA (N-(2-acetamido)imino diacetic acid, PIPES (4-piperazine-bis-ethanesulfonic acid), BIS-TRIS propane (1,3-bis[tris(hydroxymethyl)methylaminol] propane), ethylene diamine, ACES (2-[(amino-2-oxoethyl) amino]ethanesulfonic acid), imidazole, MOPS (3-(N-morphino)-propanesulfonic acid, diethyl malonic acid, TES (2-[tris(hydroxymethyl)methyl]aminoethanesulfonic acid, HEPES (N-2-hydroxyethylpiperazine-N'-2-ethanesulfonic acid), as well as other buffers with a $pK_a$ between 3.8 and 7.7.

Preferred are carbonic acid buffers such as acetate buffer and dicarboxylic acid buffers such as fumarate, tartrate and phthalate as well as tricarboxylic acid buffers such as citrate.

A further group of preferred buffers are inorganic buffers such as sulfate hydroxide, borate hydroxide, carbonate hydroxide, oxalate hydroxide, calcium hydroxide and phosphate buffers. Another group of preferred buffers are nitrogen-containing puffers such as imidazol, diethylene diamine and piperazine. Furthermore preferred are sulfonic acid buffers such as TES, HEPES, ACES, PIPES, [(2-hydroxy-1,1-bis-(hydroxymethyl)ethyl)amino]-1-propanesulfonic acid (TAPS), 4-(2-hydroxyethyl)piperazine-1-propanesulfonic acid (EEPS), 4-morpholino-propanesulfonic acid (MOPS) and N,N-bis-(2-hydroxyethyl)-2-aminoethanesulfonic acid (BES). Another group of preferred buffers are glycine, glycyl-glycine, glycyl-glycyl-glycine, N,N-bis-(2-hydroxyethyl)glycine and N-[2-hydroxy-1,1-bis(hydroxymethyl)ethyl]glycine (tricine). Preferred are also amino acid buffers such as glycine, alanine, valine, leucine, isoleucine, serine, threonine, phenylalanine, tyrosine, tryptophan, lysine, arginine, histidine, aspartate, glutamate, asparagine, glutamine, cysteine, methionine, proline, 4-hydroxy proline, N,N,N-trimethyllysine, 3-methyl histidine, 5-hydroxy-lysine, o-phosphoserine, gamma-carboxyglutamate, [epsilon]-N-acetyl lysine, [omega]-N-methyl arginine, citrulline, ornithine and their derivatives.

Preservatives for liquid dosage forms or supplements can be used on demand. They may be selected from the group comprising, but not limited to, sorbic acid, potassium sorbate, sodium sorbate, calcium sorbate, methyl paraben, ethyl paraben, methyl ethyl paraben, propyl paraben, benzoic acid, sodium benzoate, potassium benzoate, calcium benzoate, heptyl p-hydroxybenzoate, sodium methyl para-hydroxybenzoate, sodium ethyl para-hydroxybenzoate, sodium propyl para-hydroxybenzoate, benzyl alcohol, benzalkonium chloride, phenylethyl alcohols, cresols, cetylpyridinium chloride, chlorobutanol, thiomersal (sodium 2-(ethylmercurithio) benzoic acid), sulfur dioxide, sodium sulphite, sodium bisulphite, sodium metabisulphite, potassium metabisulphite, potassium sulphite, calcium sulphite, calcium hydrogen sulphite, potassium hydrogen sulphite, biphenyl, orthophenyl phenol, sodium orthophenyl phenol, thiabendazole, nisin, natamycin, formic acid, sodium formate, calcium formate, hexamine, formaldehyde, dimethyl dicarbonate, potassium nitrite, sodium nitrite, sodium nitrate, potassium nitrate, acetic acid, potassium acetate, sodium acetate, sodium diacetate, calcium acetate, ammonium acetate, dehydroacetic acid, sodium dehydroacetate, lactic acid, propionic acid, sodium propionate, calcium propionate, potassium propionate, boric acid, sodium tetraborate, carbon dioxide, malic acid, fumaric acid, lysozyme, copper-(II)-sulfate, chlorine, chlorine dioxide and other suitable substances or compositions known to the person skilled in the art.

Additional emulsifiers can be selected for example from the following anionic and non-ionic emulsifiers: Anionic emulsifier waxes, cetyl alcohol, cetylstearyl alcohol, stearic acid, oleic acid, polyoxyethylene polyoxypropylene block polymers, addition products of 2 to 60 mol ethylene oxide to castor oil and/or hardened castor oil, wool wax oil (lanolin), sorbitan esters, polyoxyethylene alkyl esters, polyoxyethylene sorbitan fatty acid esters, polyoxyethene sorbitan monolaurate, polyoxyethene sorbitan monooleate, polyoxyethene sorbitan monopalmitate, polyoxyethene sorbitan monostearate, polyoxyethene sorbitan tristearate, polyoxyethene stearate, polyvinyl alcohol, metatartaric acid, calcium tartrate, alginic acid, sodium alginate, potassium alginate, ammonium alginate, calcium alginate, propane-1,2-diol alginate, carrageenan, processed eucheuma seaweed, locust bean gum, tragacanth, acacia gum, karaya gum, gellan gum, gum ghatti, glucomannane, pectin, amidated pectin, ammonium phosphatides, brominated vegetable oil, sucrose acetate isobutyrate, glycerol esters of wood rosins, disodium phosphate, trisodium diphosphate, tetrasodium diphosphate, dicalcium diphosphate, calcium dihydrogen diphosphate, sodium triphosphate, pentapotassium triphosphate, sodium polyphosphates, sodium calcium polyphosphate, calcium polyphosphates, ammonium polyphosphate, beta-cyclodextrin, powdered cellulose, methyl cellulose, ethyl cellulose, hydroxypropyl cellulose, hydroxypropyl methylcellulose, ethyl methyl cellulose, carboxymethyl cellulose, sodium carboxymethyl cellulose, ethyl hydroxyethyl cellulose, croscarmellose, enzymically hydrolyzed carboxymethyl cellulose, mono- and diglycerides of fatty acids, glyceryl monostearate, glyceryl distearate, acetic acid esters of mono- and diglycerides of fatty acids, lactic acid esters of mono- and diglycerides of fatty acids, citric acid esters of mono- and diglycerides of fatty acids, tartaric acid esters of mono- and diglycerides of fatty acids, mono- and diacetyl tartaric acid esters of mono- and diglycerides of fatty acids, mixed acetic and tartaric acid esters of mono- and diglycerides of fatty acids, succinylated monoglycerides, sucrose esters of fatty acids, sucroglycerides, polyglycerol esters of fatty acids, polyglycerol polyricinoleate, propane-1,2-diol esters of fatty acids, propylene glycol esters of fatty acids, lactylated fatty acid esters of glycerol and propane-1, thermally oxidized soy bean oil interacted with mono- and diglycerides of fatty acids, dioctyl sodium sulphosuccinate, sodium stearoyl-2-lactylate, calcium stearoyl-2-lactylate, stearyl tartrate, stearyl citrate, sodium stearoyl fumarate, calcium stearoyl fumarate, stearyl tartrate, stearyl citrate, sodium stearoyl fumarate, calcium stearoyl fumarate, sodium laurylsulfate, ethoxylated mono- and diglycerides, methyl glucoside-coconut oil ester, sorbitan monostearate, sorbitan tristrearate, sorbitan monolaurate, sorbitan monooleate, sorbitan monopalmitate, sorbitan trioleate, calcium sodium polyphosphate, calcium polyphosphate, ammonium polyphosphate, cholic acid, choline salts, distarch glycerol, starch sodium octenyl succinate, acetylated oxidized starch.

Preferred are glycerin monooleate and stearic acid.

Stabilizers are substances that can be added to prevent unwanted changes. Though stabilizers are not real emulsifiers they may also contribute to the stability of emulsions, respectively solubilisates. Suitable examples for stabilizers are oxystearin, xanthan gum, agar, oat gum, guar gum, tara gum, polyoxyethene stearate, aspartame-acesulfame salt, amylase, proteases, papain, bromelain, ficin, invertase, polydextrose, polyvinyl pyrrolidone, polyvinyl polypyrrolidone, triethyl citrate, maltitol, maltitol syrup.

Suitable as additional surface-active solubilizing agents (solubilizers) are for example diethylene glycol monoethyl ester, polyethyl propylene glycol co-polymers, cyclodextrins such as α- and β-cyclodextrin, glyceryl monostearates such as Solutol HS 15 (Macrogol-15-hydroxystearate from BASF, PEG 660-15 hydroxystearates), sorbitan esters, polyoxyethylene glycol, polyoxyethylene sorbitanic acid esters, polyoxyethylene sorbitan monooleate, polyoxyethylene oxystearic acid triglyceride, polyvinyl alcohol, sodium dodecyl sulfate, (anionic) glyceryl monooleates etc.

Suitable aromatic and flavoring substances comprise above all essential oil that can be used for this purpose. In general, this term refers to volatile extracts from plants or parts of plants with the respective characteristic smell. They can be extracted from plants or parts of plants by steam distillation.

Krill oil extracts use to have a strong fishy taste and smell with which many people feel uncomfortable. For covering this taste and smell it is preferred that at least one aromatic and/or flavoring substance is added to the solubilisate according to the invention or to the finished solution according to the invention.

Suitable examples are: Essential oils, respectively aromatic substances from sage, cloves, chamomile, anise, star anise, thyme, tea tree, peppermint, mint oil, menthol, cineol, borneol, zingerol, eucalyptus oil, mango, figs, lavender oil, chamomile blossoms, pine needles, cypress, oranges, rosewood, plum, currant, cherry, birch leaves, cinnamon, limes, grapefruit, tangerine, juniper, valerian, lemon balm, lemon grass, palmarosa, cranberry, pomegranate, rosemary, ginger, pineapple, guava, echinacea, ivy leave extract, blueberry, kaki, melons etc. or mixtures thereof, as well as mixtures of menthol, peppermint and star anise oil or menthol and cherry flavor. Preferred is the use of peppermint.

These aromatic or flavoring substances can be included in the range of 0.0001 to 10% per weight (particularly in a composition), preferred 0.001 to 6% per weight, more preferred 0.001 to 4% per weight, most preferred 0.01 to 1% per weight, with regard to the total composition. Application- or single case-related it may be advantageous to use differing quantities.

Suitable sweeteners can be selected from the group comprising, but not limited to, mannitol, glycerol, acesulfame potassium, aspartame, cyclamate, isomalt, isomaltitol, saccharin and its sodium, potassium and calcium salts, sucralose, alitame, thaumatin, glycyrrhizin, neohesperidine dihydrochalcone, steviol glycosides, neotame, aspartame-acesulfame salt, maltitol, maltitol syrup, lactitol, xylitol, erythritol.

Suitable additional solvents may be selected from the group comprising, but not limited to, water, carbonated water, water for injection, water with isotonizing agents, saline, isotonic saline, alcohols, particularly ethyl and n-butyl alcohol, glycols, oleic and linoleic acid triglycerides, caprylic and capric acid mono-, di- and triglycerides, polyoxyethylene caprylic and capric acid glycerides, propylene glycol fatty acid esters, low alkyl fatty acid esters, soy bean oil, propylene glycol laurate, polyoxyethylene (35) castor oil, polyoxyethylene glyceryl trioleate, ethyl butyrate, ethyl caprylate, ethyl oleate and mixtures thereof.

Suitable isotonizing agents are for example pharmaceutically acceptable salts, in particular sodium chloride and potassium chloride, sugars such as glucose or lactose, sugar alcohols such as mannitol and sorbitol, citrate, phosphate, borate and mixtures thereof.

Suitable thickening agents can be selected from the group comprising, but not limited to, polyvinyl pyrrolidone, methyl cellulose, hydroxypropyl methyl cellulose, hydroxypropyl cellulose, dextrins, polydextrose, modified starch, alkaline modified starch, bleached starch, oxidized starch, enzyme-treated starch, monostarch phosphate, distarch phosphate esterified with sodium trimetaphosphate or phosphorus oxychloride, phosphate distarch phosphate, acetylated distarch phosphate, starch acetate esterified with acetic anhydride, starch acetate esterified with vinyl acetate, acetylated distarch adipate, acetylated distarch glycerol, distarch glycerin, hydroxypropyl starch, hydroxy propyl distarch glycerin, hydroxypropyl distarch phosphate, hydroxypropyl distarch glycerol, starch sodium octenyl succinate, acetylated oxidized starch, hydroxyethyl cellulose.

Diluents or fillers are inactive substances added to drugs in order to handle minimal amounts of active agents. They can be useful in the solubilizing process. Examples for suitable diluents are water, mannitol, pre-gelatinized starch, starch, microcrystalline cellulose, powdered cellulose, silicified microcrystalline cellulose, dibasic calcium phosphate dihydrate, calcium phosphate, calcium carbonate, hydroxypropyl cellulose, hydroxyethyl cellulose, hydroxypropyl methylcellulose, polyethylene glycol, xanthan gum, gum arabic or any combination thereof.

Opacifiers are substances that render the drinkable liquid opaque, if desired. They must have a refractive index substantially different from the solvent, in most cases here water. At the same time they should be inert to the other components of the composition. Suitable examples include titanium dioxide, talc, calcium carbonate, behenic acid, cetyl alcohol, or mixtures thereof.

According to the invention all of the aforementioned excipients and classes of excipients can be used without limitation alone or in any conceivable combination thereof, as long as the inventive use of a solubilisate is not thwarted, toxic actions may occur or the respective national legislations are infracted.

Thus the present application refers also to a pharmaceutical composition according to the invention for use in medicine.

In particularly preferred embodiments the pharmaceutical composition according to the invention, wherein at least one of said pharmaceutically active agents is a BCS Class 4 pharmaceutically active agent.

The term food additive refers to substances that are added to food to preserve the flavor or enhance its taste and appearance. They bestow chemical, physical or physiological effects to the food for controlling its consistency, taste, color, chemical and microbiological durability, for regulating their practical and nutritional value or for ensuring efficient food production. They can be synthetic compounds or of natural origin. In virtually all countries they are strictly regulated. Each approved additive is assigned a unique number. In Europe this number is preceded by the prefix E.

The aforementioned solubilisates of dietary supplements alone or in combination can be combined with a variety of additives, as laid out in the following:

Suitable vitamins are for example vitamin C (L-ascorbic acid, sodium L-ascorbate, calcium L-ascorbate, potassium L-ascorbate, L-ascorbyl 6-palmitate), vitamin A (retinol, retinyl acetate, retinyl palmitate, beta-carotene), vitamin D (cholealciferol, ergoalciferol), vitamin E (D-alpha-tocopherol, DL-alpha-tocopherol, D-alpha-tocopheryl acetate, DL-alpha-tocopheryl acetate, D-alpha-tocopheryl succinate), vitamin K (phylloquinone), vitamin B1 (thiamin hydrochloride, thiamin mononitrate), vitamin B2 (riboflavin, sodium riboflavin 5'-phosphate), niacin (nicotinic acid, nicotinamide), pantothenic acid (calcium D-pantothenate, sodium D-pantothenate, D-panthenol), vitamin B6 (pyridoxine hydrochloride, pyridoxine 5'-phosphate), folic acid (pteroyl monoglutaminic acid), vitamin B12 (cyanocobalamine, hydroxocobalamine), biotin (D-biotin).

Suitable minerals to be included are for example calcium (calcium carbonate, calcium chloride, citric acid calcium salt, calcium gluconate, calcium glycerophosphate, calcium lactate, ortho-phosphoric acid calcium salt, calcium hydroxide, calcium oxide), magnesium (magnesium acetate, magnesium carbonate, magnesium chloride, citric acid magnesium salt, magnesium gluconate, magnesium glycerophosphate, ortho-phosphoric acid magnesium salt, magnesium lactate, magnesium hydroxide, magnesium oxide, magnesium sulfate), iron (iron carbonate, iron citrate, iron ammonium citrate, iron gluconate, iron fumarate, iron sodium diphosphate, iron lactate, iron sulfate, iron diphosphate, ferric saccharate, elemental iron), copper (copper carbonate, copper citrate, copper gluconate, copper sulfate, copper lysine complex), iodine (sodium iodide, sodium iodate, potassium iodide, potassium iodate), zinc (zinc acetate, zinc chloride, zinc citrate, zinc gluconate, zinc lactate, zinc oxide, zinc carbonate, zinc sulfate), manganese (manganese carbonate, manganese chloride, manganese citrate, manganese gluconate, manganese glycerophosphate, manganese sulfate), sodium (sodium bicarbonate, sodium carbonate, sodium chloride, sodium citrate, sodium gluconate, sodium lactate, sodium hydroxide, ortho-phosphoric acid sodium salt), potassium (potassium bicarbonate, potassium carbonate, potassium chloride, potassium citrate, potassium gluconate, potassium glycerophosphate, potassium lactate, potassium hydroxide, ortho-phosphoric acid potassium salt), selenium (sodium selenite, sodium hydrogen selenite, sodium selenite), chrome (chrome-(III)-chloride, chrome-(III)-sulfate), molybdenum (ammonium molybdate (molybdenum (VI), sodium molybdate (molybdenum (VI)), fluorine (sodium fluoride, potassium fluoride), chlorine, phosphor.

Trace elements are dietary minerals that are needed by the organism in very small amounts for growth, development and physiology, for example as co-enzymes. Some of them are virtually always present in the organism in sufficient quantities, others have to be substituted in persons in need thereof. They can be selected from the group comprising, but not limited to, chrome, cobalt, iron, iodine, copper, manganese, molybdenum, selenium, zinc, fluoride, silicon, arsenic, nickel, rubidium, tin, vanadium. They can be substituted either as a pure element or in any of the mineral forms mentioned above.

Stimulants are often and worldwide used in drinks. According to the World Health Organization (WHO) this term refers to any kind of substances increasing, accelerating or improving neuronal activity. These substances have often a psychomimetic effect. Most popular stimulants include xanthines such as caffeine, theophylline and theobromine. Guaraná contains the aforementioned xanthines. A further popular stimulant is nicotine, respectively nicotinic acid. However, there is a broad group of stimulants that in many countries are banned by law, expected to be banned in the near future, or underlie a strict regulation of health authorities, needing the prescription of a physician. This is due to their dependence potential and other hazards to consumers' health, attention deficits in traffic etc., or negative effects on social life. This group includes a.o. amphetamine and its derivatives, a group of piperazine derivatives, cocaine and drugs for the treatment of narcolepsy and attention deficit hyperactivity disorder (ADHD). Hence the use of this group of substances according to the invention may be possible, but is discouraged, if legally banned. Preferred is the use of caffeine.

Suitable acidity regulators can be selected from the group comprising acetic acid, potassium acetate, sodium acetate, sodium diacetate, calcium acetate, carbon dioxide, malic acid, fumaric acid, sodium lactate, potassium lactate, calcium lactate, ammonium lactate, magnesium lactate, citric acid, mono-, di-, trisodium citrate, mono-, di-, tripotassium citrate, mono-, di-, tricalcium citrate, tartaric acid, mono-, disodium tartrate, mono-, dipotassium tartrate, sodium potassium tartrate, ortho-phosphoric acid, lecithin citrate, magnesium citrate, ammonium malate, sodium malate, sodium hydrogen malate, calcium malate, calcium hydrogen malate, adipic acid, sodium adipate, potassium adipate, ammonium adipate, succinic acid, sodium fumarate, potassium fumarate, calcium fumarate, ammonium fumarate, 1,4-heptonolactone, triammonium citrate, ammonium ferric citrate, calcium glycerophosphate, isopropyl citrate, potassium carbonate, potassium bicarbonate, ammonium carbonate, ammonium bicarbonate, magnesium carbonate, magnesium bicarbonate, ferrous carbonate, ammonium sulfate, aluminum potassium sulfate, aluminum ammonium sulfate, sodium hydroxide, potassium hydroxide, ammonium hydroxide, magnesium hydroxide, gluconic acid.

Acidifiers use to be inorganic chemicals that either produce or become acid. Suitable examples are: Ammonium chloride, calcium chloride.

EXAMPLES

In the ensuing examples the relative quantities of the solubilizing agents can be changed inside the margins indicated for each component in the method according to the invention. The addition of glyceryl oleate and tocopherol is optional.

The resulting solubilisate can be diluted with an aqueous solution in order to obtain a finished solution. The volume of the aqueous solution can vary according to the desired volume of the finished solution.

It is possible to upscale or downscale the indicated amounts according to the desired absolute amount of the agent to be solubilized in the solubilisate. The solubilisate can be portioned according to the desired final amount of the agent that shall be administered to a patient in need thereof or consumed by a dietary supplement user.

In general, the produced solubilisates produced according to the method of the invention had a specific gravity of 0.91-0.94.

The maritime krill oil extract used in the Examples was purchased from Enzymotec (Israel), except where indicated. Standard chemicals were purchased from Sigma-Aldrich, Darmstadt, Germany.

Example 1: Solubilization of Azithromycin

Azithromycin is a broad-spectrum antibiotic that is widely used against infections by some Gram-positive, some Gram-negative and many atypical bacteria. Azithromycin belongs to BCS Class 4 (low solubility—low permeability) pharmaceuticals.

The following indications refer to the weight percent of the mixture. A solubilisate of ca. 20 ml was generated. Azithromycin was provided, and then the krill oil was admixed under stirring for 5 min at room temperature (20±5° C.) and atmospheric pressure.

| azithromycin | 5.0% |
|---|---|
| krill oil extract | 95.0% |

Then the composition was cautiously heated under continued stirring, with an approximate temperature increment of 2° C./min. After ca. 23 min (ca. 65° C.) the composition started to become a clear solution. This solubilization process lasted for ca. 5 min more. Thus a solubilisate according to the invention was obtained after ca. 28 min at ca. 75° C. Then the heating and the stirring was stopped and the resulting solubilisate was allowed to cool down to room temperature.

Upon being diluted into an aqueous finished solution (10 ml solubilisate added to 90 ml bidest. water) under stirring the finished solution became quickly clear and had a slightly whitish appearance.

The bitter taste of azithromycin—which often causes a compliance problem, especially with children—could be covered by this solubilisate.

Example 2: Solubilization of Aciclovir

Aciclovir is an antiviral pharmaceutical agent. It is frequently used in the treatment of Herpes simplex infections, shingles and chickenpox. Aciclovir belongs to BCS Class 4 (low solubility—low permeability) pharmaceuticals.

The following indications refer to the weight percent of the mixture. A solubilisate of ca. 20 ml was generated. Aciclovir was provided, and then the krill oil extract and the additional agents were admixed one by one under stirring for 5 min at room temperature (20±5° C.) and atmospheric pressure.

| aciclovir | 1.0% |
|---|---|
| krill oil extract | 97.0% |
| glyceryl stearate | 1.9% |
| alpha-tocopherol | 0.1% |

Then the composition was cautiously heated under continued stirring, with an approximate temperature increment of 2.5° C./min. After ca. 24 min (ca. 80° C.) the composition started to become a clear solution. This solubilization process lasted for ca. 4 min more. Thus a solubilisate according to the invention was obtained after ca. 28 min at ca. 90° C.

Then the heating and the stirring was stopped and the resulting solubilisate was allowed to cool down to room temperature. The solubilisate stayed clear and stable over min. 3 weeks.

Upon being diluted into an aqueous finished solution (8 ml solubilisate added to 92 ml bidest. water) under stirring the finished solution became quickly clear and had a slightly whitish appearance.

The taste of aciclovir—which patients often describe as unpleasant, sometimes also as metallic—could be covered by this solubilisate.

Example 3: Solubilization of Ginger Extract

Ginger (*Zingiber officinale*) is an herb that can reach a height of 0.5-1.5 m and is native to the tropics and subtropics. The rhizome is used for a long time as a nutrient and in European, Arabic and Chinese folk medicine. For some rhizome preparations antiemetic, antioxidative and anti-inflammatory actions were described. Stimulating effects were found on the secretion of saliva, gastric juice and gall. In traditional Asian medicine it is used against colds, muscle pain and rheumatic diseases. The most important ingredients comprise gingerol, zingiberene, diaryl heptanoids, shogaol, zingiberol, cineol, borneol, shoagol and zingerone. Its clinical use, however, is strongly limited by the low bioavailability, when orally administered. As a dietary supplement, there is the same problem of a low bioavailability, due to the low solubility of the extract ingredients in water.

The following indications refer to the weight percent of the mixture. A solubilisate of ca. 20 ml was generated. Ginger (*Zingiber officinale*) VE $Co^2$ extract (Flavex Naturextrakte GmbH, Rehlingen-Siersburg, Germany) was provided, and then and then the krill oil extract and the additional agents were admixed in a closed vessel under stirring for 5 min at room temperature (20±5° C.) and atmospheric pressure. The lysophosphatidylcholine used herein was purchased from Lipoid GmbH, Ludwigshafen, Germany).

| | |
|---|---|
| *Zingiber officinale* extract | 4.95% |
| krill oil extract | 87.0% |
| 2-lysophosphatidylcholine | 5.0% |
| oleic acid | 2.0% |
| glyceryl stearate | 1.0% |
| ascorbyl palmitate | 0.05% |

Then the composition was cautiously heated under continued stirring, with an approximate temperature increment of 1.5° C./min. After ca. 27 min (ca. 60° C.) the composition started to become a clear solution. This solubilization process lasted for ca. 9 min more. Thus a solubilisate according to the invention was obtained after ca. 36 min at ca. 74° C. Then the heating and the stirring was stopped and the resulting solubilisate was allowed to cool down to room temperature. The solubilisate stayed clear and stable over min. 2 months.

Upon being diluted into an aqueous finished solution (2 ml solubilisate added to 100 ml bidest. water) under stirring the finished solution became quickly clear.

Example 4: Solubilization of *Boswellia sacra* Extract

*Boswellia sacra* is the classic frankincense shrub. It is cultivated in Somalia, Yemen and Oman. Extracts from *Boswellia sacra* are often used as a dietary supplement. The main active agents of this extract are boswellic acids that comprise a number of pentacyclic triterpenes. They display anti-inflammatory actions by inhibiting the enzyme 5-lipooxygenase in a non-competitive manner. Thus, the generation of leukotrienes is subdued. Moreover, they have a skin-soothing effect. Allergic and/or inflammatory reactions of the skin can be mitigated by application of such an extract. The solubility in water of this extract is rather low.

The following indications refer to the weight percent of the mixture. A solubilisate of ca. 20 ml was generated. *Boswellia sacra* extract (Boswellin AKBBA extract; Sabinsa, Langen, Germany) was provided, and then the krill oil extract (QRILL™ Aqua, Aker BioMarine, Norway; phosphatidylcholine content ca. 45%) was admixed under stirring for 5 min at room temperature (20±5° C.) and atmospheric pressure.

| | |
|---|---|
| *Boswellia sacra* extract | 5.0% |
| krill oil extract | 95.0% |

Then the composition was cautiously heated under continued stirring, with an approximate temperature increment of 1° C./min. After ca. 50 min (ca. 70° C.) the composition started to become a clear solution. This solubilization process lasted for ca. 10 min more. Thus a solubilisate according to the invention was obtained after ca. 1 h at ca. 80° C. Then the heating and the stirring was stopped and the resulting solubilisate was allowed to cool down to room temperature. The solubilisate stayed clear and stable over min. 12 months.

Upon being diluted into an aqueous finished solution (2 ml solubilisate added to 100 ml bidest. water) under stirring the finished solution became quickly clear.

Example 5: Solubilization of Green Tea Extract

Green tea extract is produced from green tea leaves (*Camellia sinensis*). The main components apart of caffeine are green tea catechins, such as epigallocatechin-3-gallate (EGCG), epicatechin (EC), epicatechin-3-gallate (ECg), epigallocatechin (EGC), catechin, and gallocatechin (GC), with EGCG being the most abundant of them in green tea extract. Green tea extract is often used as a dietary supplement, aiming at healthy effects attributed to catechins. They include above all antioxidant, anticarcinogenic, anti-inflammatory and anti-radiation actions. However, catechins, in particular EGCG, show a poor bioavailability and the solubility in water is rather limited.

The following indications refer to the weight percent of the mixture. A solubilisate of ca. 20 ml was generated. Green tea extract (Sabinsa, Langen, Germany) was provided, and then the krill oil extract and the additional agents were admixed one by one under stirring for 5 min at room temperature (20±5° C.) and atmospheric pressure. The phosphatidylcholine used herein was purchased from Lipoid GmbH, Ludwigshafen, Germany).

| | |
|---|---|
| green tea extract | 5.0% |
| krill oil extract | 78.0% |
| phosphatidylcholine (PC and DMPC, weight ratio 1:1) | 15.0% |
| glyceryl stearate | 1.7% |
| glyceryl oleate | 0.2% |
| delta-tocopherol | 0.1% |

Then the composition was cautiously heated under continued stirring, with an approximate temperature increment of 2° C./min. After ca. 35 min (ca. 90° C.) the composition started to become a clear solution. This solubilization process lasted for ca. 7 min more. Thus a solubilisate according to the invention was obtained after ca. 42 min at ca. 105° C. Then the heating and the stirring was stopped and the resulting solubilisate was allowed to cool down to room temperature. The color of the solubilisate was dark brownish. The solubilisate stayed clear and stable over min. 16 months.

Upon being diluted into an aqueous finished solution (2 ml solubilisate added to 100 ml bidest. water) under stirring the finished solution became quickly clear and had a pale white brownish appearance.

The grassy (herbal) taste of diluted green tea extract could be covered by this solubilisate. This also holds true for the sometimes bitter taste of green tea, depending on the blend, which renders green tea unpopular for some people.

The invention claimed is:

1. A method for producing a solubilisate of a poorly water-soluble pharmaceutically active agent or a poorly water-soluble dietary supplement for use in an aqueous solution, wherein said krill oil solubilisate is for oral intake, the method consisting essentially of the following steps:
   a) providing at least one poorly water-soluble pharmaceutically active agent or poorly water-soluble dietary supplement in the overall range of 0.5% to 25% per weight at room temperature and a pressure of 0.2 bar to 1 bar,
   b) adding at least one krill oil extract in the overall range of 75 wt % to 99.5 wt % to form a resulting mixture;
   c) cautiously heating the resulting mixture by continuously increasing the temperature with a continuous temperature increment of 0.5° C./min-3° C./min over a period of 20 minutes-60 minutes;
   d) stopping the temperature increase at a temperature end point in a temperature range of about 35° C. to 125° C. as soon as a clear solution of the mixture is reached, wherein any combination of parameters of the room temperature of step a) and the continuous temperature increment and heating period of step c), respectively, is possible, under the proviso that the resulting temperature end point is in the temperature range of about 35° C. to 125° C.; and
   e) letting the resulting krill oil solubilisate cool down to room temperature to produce the krill oil solubilisate of a poorly water-soluble pharmaceutically active agent or dietary supplement, wherein said poorly water-soluble pharmaceutically active agent or dietary supplement requires more than 250 ml of aqueous media over a pH range of 1-7.5 for the highest dose used of the poorly water-soluble pharmaceutically active agent or dietary supplement to be dissolved in the water to form a resulting krill oil solubilisate; and wherein the resulting solubilisate is not an emulsion.

2. The method according to claim 1, wherein the overall range of the at least one krill oil extract is 75% to 99% per weight, and at least one of phosphatidylcholines in the overall range of 0.5% to 24.5% per weight, lysophosphatidylcholines in the overall range of 0.5% to 10% per weight, medium-chained triglycerides in the overall range of 0.5% to 24.5% per weight, $C_2$ to $C_4$ alcohols in the overall range of 0.5% to 5% per weight, glyceryl stearate in the overall range of 0.5% to 3% per weight, saturated or unsaturated $C_{14}$ to $C_{20}$ fatty acids in the overall range of 0.5% to 3% per weight, and/or antioxidants in the overall range of 0.01% to 3% per weight which are admixed together with the at least one krill oil extract, and wherein the relative weight percentages of the at least one pharmaceutically active agent or dietary supplement, the at least one krill oil extract and the admixed substances add up to 100%.

3. The method according to claim 2, wherein said at least one antioxidant is ascorbyl palmitate and/or at least one tocopherol.

4. The method according to claim 1, wherein the at least one krill oil extract has a phosphatidylcholine content greater than 40% per weight.

5. The method according to claim 1, wherein at least one krill oil extract has been extracted by cold extraction technique, wherein the extraction temperature was <25° C.

6. The method according to claim 1, wherein no polysorbate is used for the solubilization.

* * * * *